Dec. 27, 1938.  C. P. BALL, JR  2,141,966
HYDRAULIC BRAKE
Filed Oct. 11, 1937  4 Sheets-Sheet 1

Inventor
Charles P. Ball, Jr.
By Mason & Porter
Attorneys

Dec. 27, 1938.  C. P. BALL, JR  2,141,966
HYDRAULIC BRAKE
Filed Oct. 11, 1937  4 Sheets-Sheet 2

Inventor
Charles P. Ball, Jr.

By Mason & Porter
Attorneys

Dec. 27, 1938.    C. P. BALL, JR    2,141,966
HYDRAULIC BRAKE
Filed Oct. 11, 1937    4 Sheets-Sheet 3
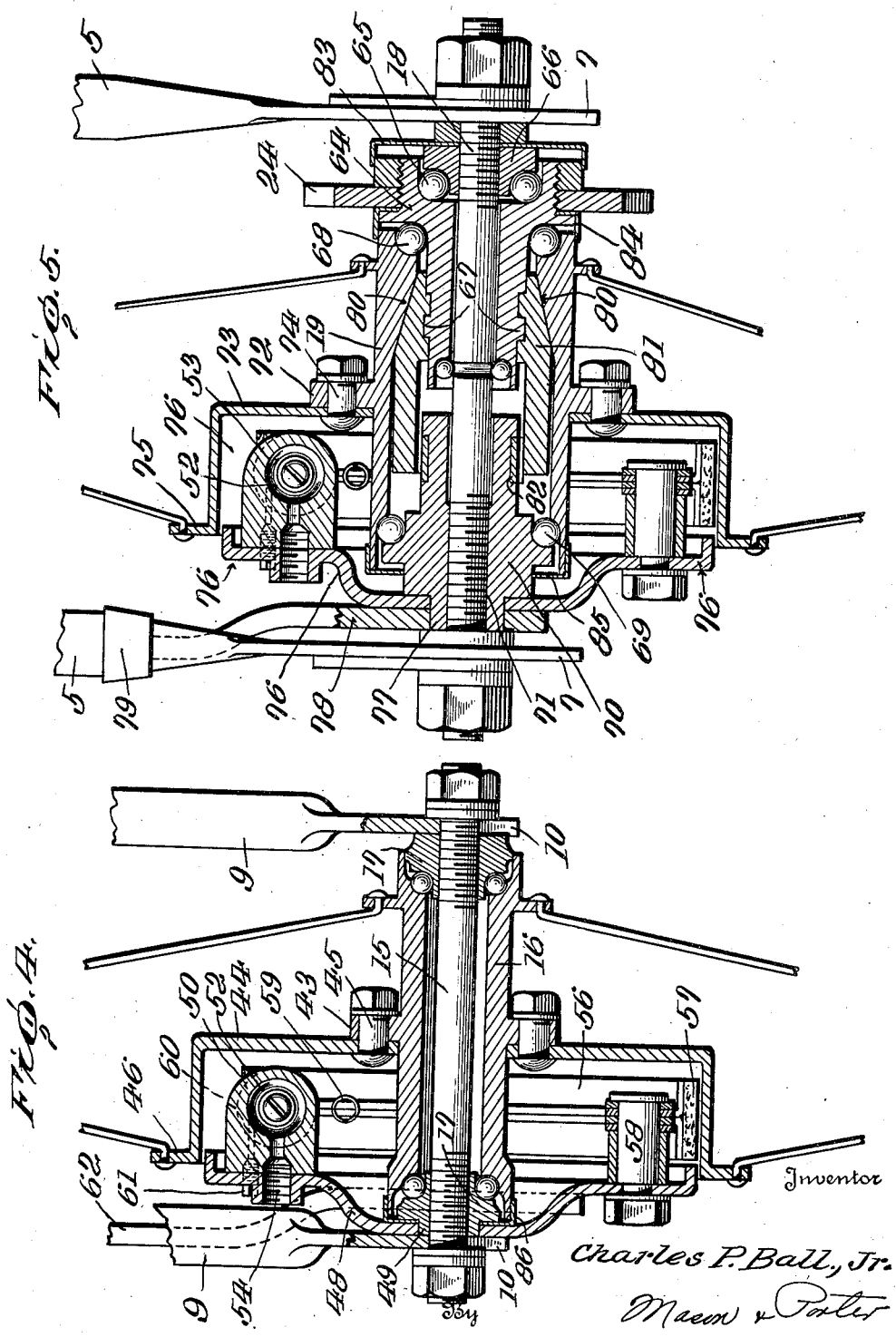
Inventor
Charles P. Ball, Jr.
Mason & Porter
Attorneys Dec. 27, 1938.   C. P. BALL, JR   2,141,966
HYDRAULIC BRAKE
Filed Oct. 11, 1937   4 Sheets-Sheet 4
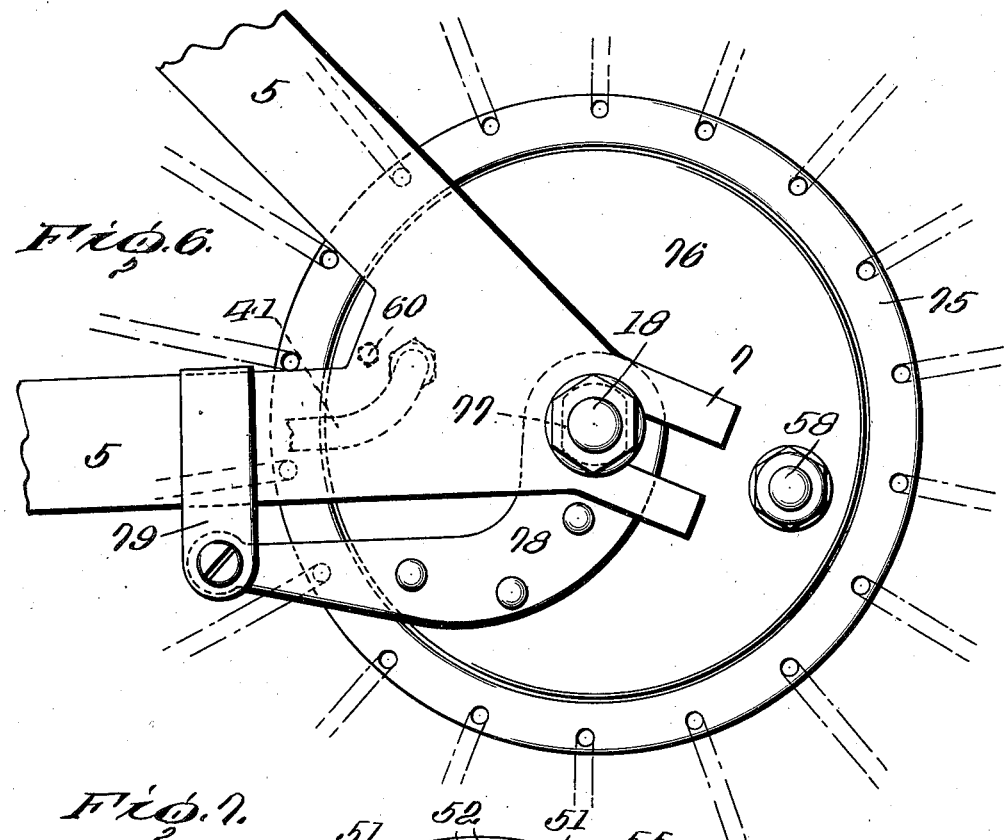
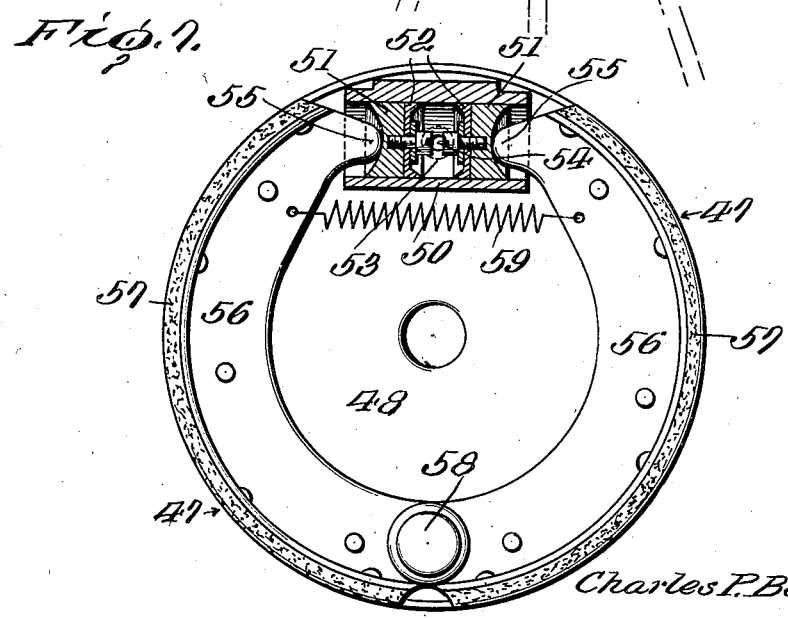
Inventor
Charles P. Ball, Jr.
By Mann & Porter
Attorneys Patented Dec. 27, 1938

2,141,966

UNITED STATES PATENT OFFICE 2,141,966

HYDRAULIC BRAKE

Charles Perry Ball, Jr., Torrington, Conn., assignor to The Torrington Company, Torrington, Conn., a corporation of Connecticut Application October 11, 1937, Serial No. 168,511

14 Claims. (Cl. 192—5)

The invention relates generally to brakes of the hydraulic type, and primarily seeks to provide a novel hydraulic braking equipment for use on bicycles or similar manually propelled vehicles.

An object of the invention is to provide a hydraulic brake equipment for use on bicycles or the like and controlled by simple back pedaling, or reverse movement of the propelling crank, to apply a braking action to a wheel or wheels of the vehicle.

Another object of the invention is to provide a braking equipment of the character stated which is controlled directly from the crank, not indirectly through the drive chain, and operated by pressure from a master cylinder disposed at or near the crank hub.

Another object of the invention is to provide novel means for maintaining the pressure fluid under constant pressure in a manner tending to minimize seepage.

With the above and other objects in view which will more fully appear, the nature of the invention will be more clearly understood by following the description, the appended claims, and the several views illustrated in the accompanying drawings.

In the drawings:—

Figure 4 is an enlarged longitudinal section illustrating the front wheel braking equipment, the section being taken on the line 4—4 on Figure 1.

Figure 5 is an enlarged longitudinal section illustrating the rear wheel braking equipment, the section being taken on the line 5—5 on Figure 1.

Figure 6 is an enlarged detail side elevation of the rear wheel braking equipment.

Figure 7 is an enlarged detail inside elevation of one of the removable cylinder, plate and brake element units removed from the associated wheel.

Figure 8 is a detail side elevation of the screw sleeve.

Figure 1:
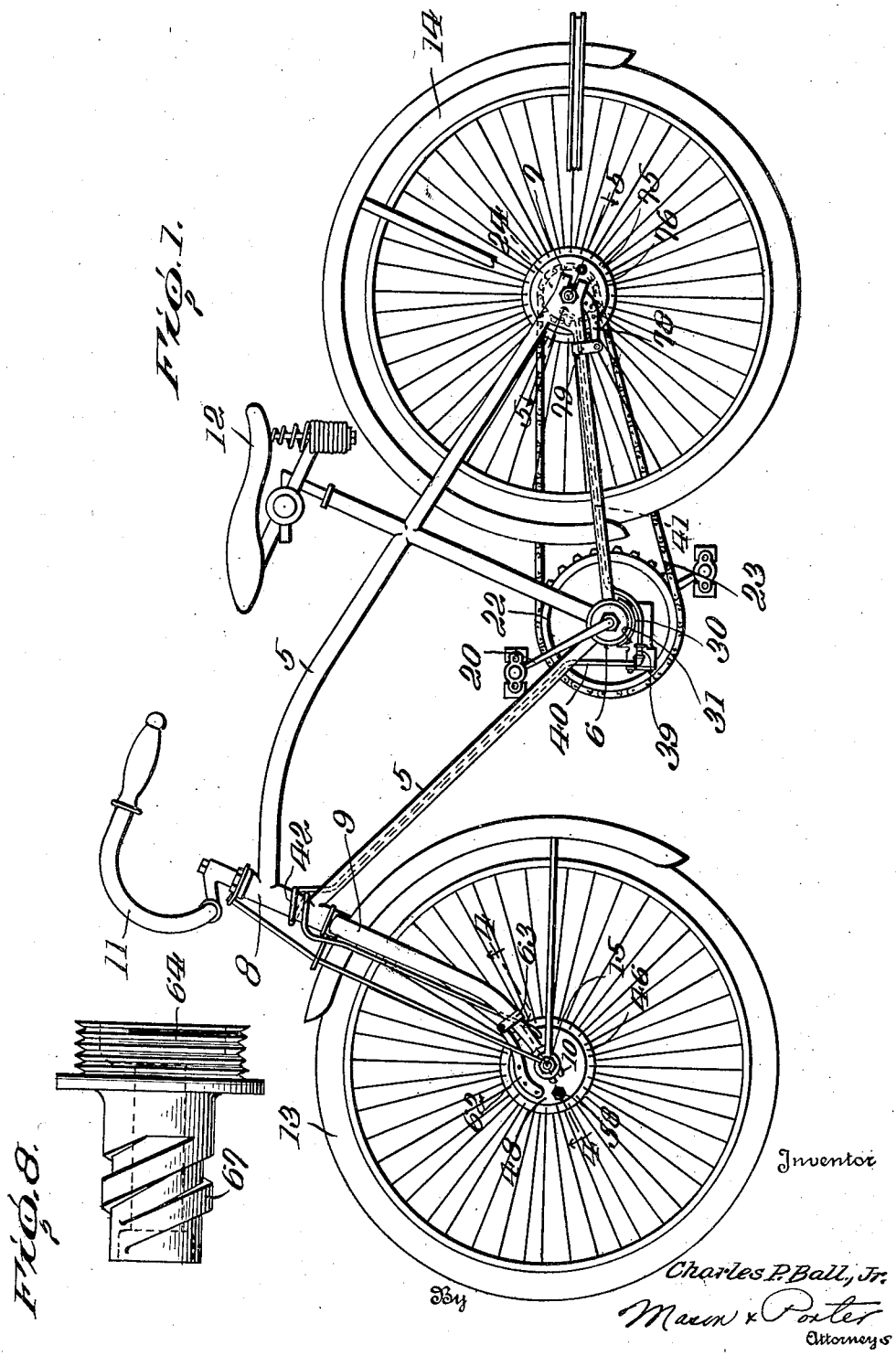
Figure 1 is a side elevation of a bicycle equipped with the invention.

In the drawings the invention is illustrated as applied to a conventional type bicycle composed of the usual frame 5, crank hub 6, bifurcated rear wheel bearing 7, fork bearing 8, and forks 9 terminating at their lower ends in the bifurcated front wheel bearings 10. The usual handle bars 11 and seat 12 are included, and the front and rear wheels are designated 13 and 14 respectively. See Figure 1.

The front wheel 13 is mounted upon the usual axle 15 supported in the fork bearings 10, and the wheel includes the usual hub 16 which has anti-friction bearing on cone bearings 17 mounted on the front axle. See Figure 4.

The rear axle 18 is supported in the frame bearing 7 and the rear wheel 14 includes a hub 19 which is mounted on anti-friction bearings to rotate about the rear axle in a manner soon to be described. See Figure 5.

The usual propelling crank 20 is supported in the crank hub 6 in anti-friction bearings 21, and the usual sprocket 22 is provided and serves to transmit the rotary motion of the crank 20, through transmission chain 23, to the small sprocket 24 mounted on the rear wheel in a manner soon to be described.

Figure 2:
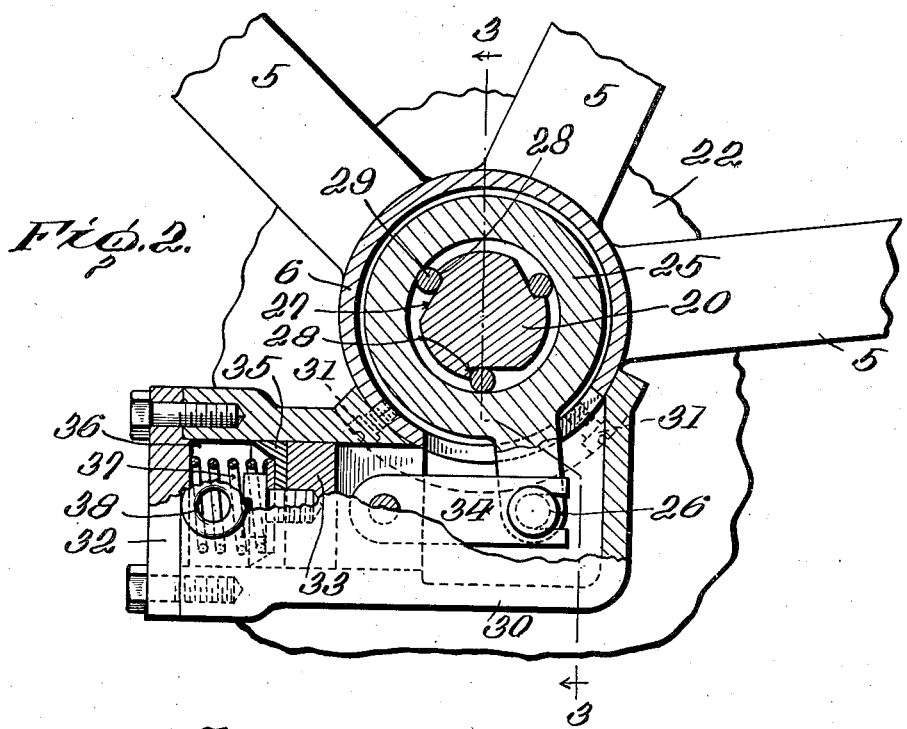
Figure 2 is a detail vertical cross section taken through the crank hub, the section being taken substantially on the line 2—2 of Figure 3.
Figure 3:
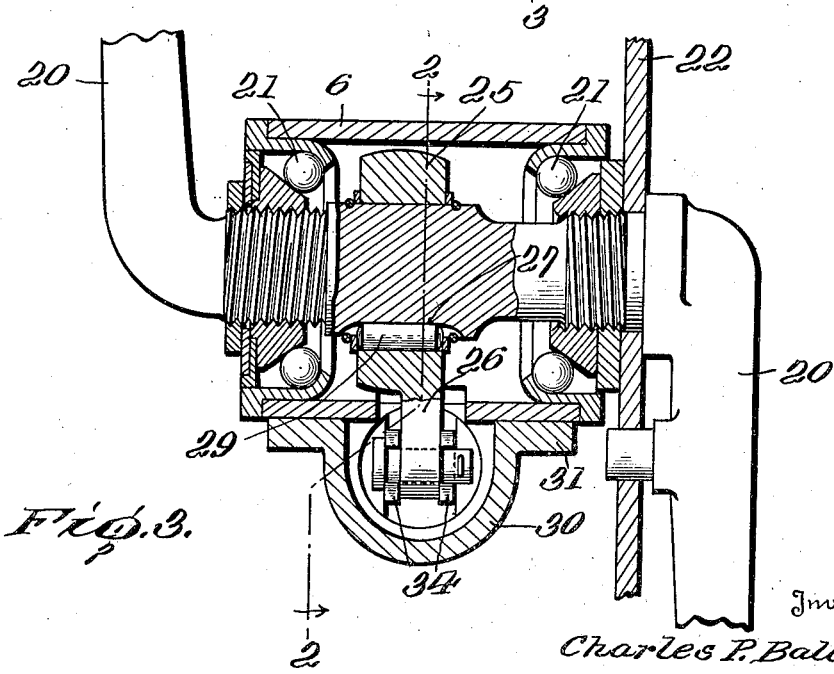
Figure 3 is a detail vertical longitudinal section taken substantially on the line 3—3 on Figure 2.

A crank ring 25 encircles the crank within the hub 6 and this ring includes a crank extension 26 projecting through an opening provided therefor in the bottom of the hub 6, as shown in Figures 2 and 3 of the drawings. The periphery of the shaft portion of the crank 20 is recessed to provide cam faces 27 and abutment shoulders 28. Rollers 29 are mounted in the recesses and in the spaces surrounding the crank shaft portion within the ring 25. By reference to Figures 2 and 3 of the drawings, it will be observed that as the crank is rotated in forward direction, that is in the direction for propelling the bicycle forwardly, the abutment shoulders 28 will engage the rollers 29 and propel them freely about within the ring 25. Whenever attempt is made, however, to rotate the crank shaft portion in the reverse direction, or in other words, whenever the crank is back-pedaled, the cam surfaces 27 will wedge the rollers 29 against the ring 25 and cause the ring to move with the crank and impart forward movement to the depending arm or crank 26.

A master cylinder 30 is flange secured, as at 31, directly beneath the crank hub 6 and in communication with the bottom opening therein, so that the ring arm 26 will project into an end of the cylinder. The forward, open end of the cylinder is closed by a removable cover 32 and a piston 33 is slidably mounted in the cylinder, and link connected, as at 34 to the lower end of the ring arm 26. The end of the piston opposed to the cover plate 32 is equipped with a flexible, feathered washer 35, and between this washer and the cover plate 32 a chamber or fluid reservoir 36 is formed within the cylinder. A spring 37 is interposed between the cover plate 32 and the piston end and tends to move the piston outwardly or in the pressure relieving direction. A port 38 opens laterally into the fluid chamber 36 and this port is connected by a T-union 39 with a pressure line 40 leading to the front of the vehicle and a pressure line 41 leading to the rear of the vehicle. The pressure lines 40 and 41 preferably follow frame lines as indicated in Figure 1 of the drawings, and in order to provide for steering the bicycle, by turning of the forks 9, the forward pipe line 40 may be coiled about the forked bearing 8, as shown in the said Figure 1. See 42.

The hub 16 of the front wheel is provided with a flange 43 and a brake drum 44 is secured, as at 45, to the flange. The brake drum includes a peripheral flange portion 46 to which wheel spokes at that particular side of the wheel are secured, the remaining spokes being secured to the usual flange at the opposite end of the hub, as shown in Figure 4.

It will be observed that the brake drum 44 is of large diameter, affording an unusually large amount of braking surface, and for co-operation with this brake drum there is provided a novel plate, cylinder and brake element assembly, removable and replaceable as a unit from the front wheel structure. This unit has been generally designated 47 and shown in detail in Figure 7 of the drawings. The unit includes a plate 48 with a diameter for closing the open end of the brake drum 44, as shown in Figure 4 of the drawings. The plate is equipped with a central aperture for fitting the hub extension 49 of the cone bearing 17 at that particular side of the wheel, and at its inner face the plate carries an open ended cylinder 50 which may be secured to the plate in any approved manner. A pair of opposed, free pistons 51 are slideably mounted within the cylinder 50. The opposing faces of the pistons are equipped with flexible, feathered washers 52 and a pressure chamber 53 is formed between the pistons, as shown in Figure 7 of the drawings. The front pressure or pipe line 40 communicates with the chamber 53 through a port 54 opening laterally through the cylinder and the adjacent plate wall.

The outer ends of the pistons 51 are recessed, as shown in Figure 7, to receive the free ends of a pair of brake elements 56 which carry the usual removable and replaceable brake shoes 57 presented for engagement with the internal surface of the brake drum 44, as shown in Figure 4. The elements 56 are pivoted together and to the plate 48, as indicated at 58 in Figures 4 and 7. A spring element 59 is secured at its respective ends to the elements 56 beneath the cylinder 50, and serves to normally hold the brake shoes 57 free of engagement with the brake drum. This spring also tends to force the pistons 51 toward each other and against the pressure fluid impounded between them. By thus holding the pressure fluid constantly under pressure, the feathered washers 52 will be expanded and seepage of pressure fluid will be reduced to the minimum. By this means, also, tendencies toward the creation of pockets within the pressure column are eliminated and the brakes are always ready for service without prior necessity of taking up lost motion or filling out pockets in the pressure column. Whenever it is desirable to replenish the supply of pressure fluid in the chamber 53, this can be accomplished through the filler duct 60 by removal of the closure plug 61. See Figure 4 of the drawings.

Whenever the brake shoes 57 are pressed against the rotating brake drum 44 to brake rotation of the front wheel, it is natural that the plate 48 and the assembly carried thereon would tend to rotate with the brake drum. The assembly is held stationary, against rotation with the brake drum by a bracket member 62 secured to the plate 48, and, as at 63, to the fork 9, as shown in Figures 1 and 4 of the drawings.

The driven sprocket 24 is secured upon a sleeve 64 which has anti-friction bearing, as at 65, at one end of the rear axle 18, said sleeve being secured against movement laterally along the axle by a cone bearing 66. The sleeve 64 includes an externally threaded surface 67, the purpose for which will soon be described. See Figure 8.

The rear wheel hub 19 has anti-friction bearing, as at 68, on the sleeve 64 and, as at 69, on another sleeve member 70 threaded, as at 71, at the remaining end of the axle 18 opposite the cone bearing.

Like the front wheel hub, the rear wheel hub 19 includes a flange 72 to which a brake drum 73 is secured, as at 74, and the brake drum includes a peripheral flange 75 for co-operating with the usual hub flange equipment in receiving the wheel spokes. A plate, cylinder and brake element unit constructed in the same manner and serving the same purpose as the unit previously described and generally designated 47 in Figure 7 of the drawings co-operates with the brake drum 73. Since these units are the same in construction and operation, the unit co-operating with the rear brake drum 73 has been generally designated 76, and further detailed description thereof is thought to be unnecessary.

The plate of the unit 76 has a non-circular central aperture mountable on the similarly shaped hub extension 77 of the sleeve 70, and a bracket arm 78, similarly apertured to receive the hub extension 77, is rigidly secured to the plate and, as at 79, to the bicycle frame, as shown in Figures 5 and 6 of the drawings.

The rear wheel hub 19 is provided internally with a cone clutch face 80 which co-operates with a similar face on a clutch sleeve 81 threaded on the sleeve 64, hereinbefore described. A spring element 82 is carried in a recess on the sleeve 70, and frictionally engages the clutch sleeve 81, as shown in Figure 5 of the drawings.

A dust cap 83 may be provided for protecting the opening between the cone bearing 66 and the sleeve 64. A similar cap 84 may be provided to protect the opening between the sleeve 64 and the hub 19, and another 85 to protect the opening between the hub 19 and the sleeve 70. A similar protection may be provided at 86 for the opening between the hub 16 and the cone bearing 17 interiorly of the plate 48. See Figure 4.

In the use of a bicycle equipped with the invention as shown in Figure 1 of the drawings, front pedaling or forward propulsion of the vehicle will have no effect on the braking equipment, since the ring 25, crank shaft recess and roller equipments 27—29 act as an over-running clutch and permit free rotation of the crank shaft within the ring 25. Whenever the crank is back-pedaled, or moved in the reverse direction, the ring 25 will be caused to move with it in the manner previously described, and a forward movement of the ring arm 26 will result. This movement of the arm 26 causes the piston 33 to exert pressure on the fluid column filling the master cylinder chamber 36, pipe lines 40 and 41, and the actuator cylinders in the front and rear brake units 47 and 76.

The back-pedaling or reverse movement of the crank is simultaneously transmitted through the chain 23 to the rear sprocket 24 and sleeve 64. During forward movement of the bicycle, or normal operation of the power transmitting crank, chain and sprocket equipment, the threaded engagement between the sleeves 64 and 81 hold the cone clutch surfaces of the sleeve 81 and hub in a tight engagement, and through these parts the rotation of the sprocket 24 is transmitted to the rear wheel 14. But upon reverse rotation of the sprocket 24, the threaded engagement between the sleeves 64 and 81 causes the latter to move longitudinally in a direction for bringing about separation of the clutch faces and releasing of the driving connection between the sprocket 24 and the rear wheel. The tendency of the sleeve 81 to rotate freely with the sleeve 64 when the clutch surfaces have been freed and it is sought to again effect a forward propulsion, is overcome by the frictional engagement of the spring 82.

The pressure exerted in the actuator cylinders of the units 47 and 76 (see chamber 53 in Figure 7) causes the pistons to move outwardly and the brake shoes to be applied to the brake drums. By manipulation of the crank 20, a smooth and constant, graded brake pressure may be applied simultaneously at both front and rear wheels.

The advantages of the simple and compact brake equipment herein described are many. The advantage of controlling brake actuation directly from the crank, as distinguished from an indirect control through the chain will be obvious, for by this means loss of brake control due to breakage of the driving chain is avoided. The equipment provides for simultaneous and smooth braking at both front and rear wheels and under control of a master cylinder centrally disposed directly on the crank hub. It is to be understood, however, that single brake equipments at front or rear may be employed if desired.

It will be noted that the brake drums are relatively large, affording powerful braking action and equipment which will not become unduly heated during the braking function because of the greater radiating surface provided. The means provided for constantly holding the fluid column under pressure also affords advantages by reducing to the minimum the possibilities of fluid seepage, and by avoidance of loss of motion and air pockets in the fluid column which would have to be dissipated before an actual braking action could take place.

I claim:

1. In hydraulic braking apparatus for bicycles including front and rear wheels, a frame having a crank bearing, a crank rotatable in the bearing and power transmitting connections between the crank and the rear wheel; hydraulically operable braking equipment for a wheel of the bicycle, and means disposed at the crank bearing and actuated by back pedaling movement of the crank for operating said braking equipment.

2. In hydraulic braking apparatus for bicycles including front and rear wheels, a frame having a crank bearing, a crank rotatable in the bearing and power transmitting connections between the crank and the rear wheel; hydraulically operable braking equipment for a wheel of the bicycle, means actuated by back pedaling movement of the crank for operating said braking equipment, said last-named means including a master pressure cylinder mounted on the crank bearing, a pressure line connecting the cylinder with the braking equipment, and means actuated directly by the crank for applying pressure through the line to the braking equipment.

3. In hydraulic braking apparatus for bicycles including front and rear wheels, a frame having a crank bearing, a crank rotatable in the bearing and power transmitting connections between the crank and the rear wheel; hydraulically operable braking equipment for each wheel of the bicycle and means actuated by back pedaling movement of the crank for simultaneously operating both said braking equipments.

4. In hydraulic braking apparatus for bicycles including front and rear wheels, a frame having a crank bearing, a crank rotatable in the bearing and power transmitting connections between the crank and the rear wheel; hydraulically operable braking equipment for each wheel of the bicycle and means actuated by back pedaling movement of the crank for simultaneously operating both said braking equipments, said last-named means including a master pressure cylinder mounted on the crank bearing, a pressure line connecting the cylinder with each braking equipment, and means actuated directly by the crank for applying pressure through the line to the braking equipments.

5. In hydraulic braking apparatus for bicycles including front and rear wheels, a frame having a crank bearing, a crank rotatable in the bearing and power transmitting connections between the crank and the rear wheel; hydraulically operable braking equipment for the rear wheel, and means actuated directly by back pedaling of the crank and independently of the power transmitting connections for operating said braking equipment.

6. In hydraulic braking apparatus for bicycles including front and rear wheels, a frame having a crank bearing, a crank rotatable in the bearing and power transmitting connections between the crank and the rear wheel; hydraulically operable braking equipment for the rear wheel, normally engaged clutch devices in said power transmitting connections, means actuated by back pedaling of the crank for releasing the clutch devices, and means disposed at the crank bearing and actuated by back pedaling for effecting operation of the braking equipment.

7. In hydraulic braking apparatus for bicycles including front and rear wheels, a frame having a crank bearing, a crank rotatable in the bearing and power transmitting connections between the crank and the rear wheel; hydraulically operable braking equipment for the rear wheel, normally engaged clutch devices in said power transmitting connections, means actuated by back pedaling of the crank for releasing the clutch devices, and means disposed at the crank bearing and actuated by back pedaling for effecting operation of said braking equipment, said clutch devices including a rotatable screw sleeve independently rotatable only during back pedaling, and elements having engaging clutch faces separable by independent rotation of said sleeve.

8. In hydraulic braking equipment for a bicycle, including a braking equipment, a propelling crank and shaft and a crank shaft bearing and hub therefor, pressure applying means comprising a pressure fluid impounding cylinder mounted on said hub, a piston opposed to the fluid in the cylinder, means operable upon back pedaling of the crank for moving said piston to impart pressure to said fluid, and means for distributing the pressure fluid to said braking equipment.

9. In hydraulic braking equipment for a bicycle including a braking equipment, a propelling crank and shaft and a crank shaft bearing and hub therefor, pressure applying means comprising a pressure fluid impounding cylinder mounted on said bearing, a piston opposed to the fluid in the cylinder, a ring encircling the crank shaft in the bearing hub including a crank arm extending into the cylinder and having connection with the piston, an overruning clutch connection between the ring and the crank shaft whereby back pedaling of the crank will transmit movement to the piston through said crank arm and connection and exert pressure on said fluid, and means for distributing the pressure fluid to said braking equipment.

10. In hydraulic braking apparatus for bibycles including front and rear wheels, a frame having a crank bearing, a crank rotatable in the bearing and driving and driven sprocket and chain connections between the crank and the rear wheel; hydraulically operable braking equipment for the rear wheel an axle about which the rear wheel is rotatable, a screw sleeve rotatable on said axle and secured to said driven sprocket, a clutch sleeve threaded on said screw sleeve, said clutch sleeve and said rear wheel having normally engaging clutch faces, said clutch sleeve being rotatable with the screw sleeve and the wheel during forward rotation of the driven sprocket and movable along the screw sleeve by reverse movement of the screw sleeve to disengage the clutch faces, means tending to prevent rotation of the clutch sleeve with the screw sleeve during separation of the clutch faces, and means for effecting operation of said braking equipment.

11. In hydraulic braking apparatus for bicycles including front and rear wheels, a frame having a crank bearing, a crank rotatable in the bearing and driving and driven sprocket and chain connections between the crank and the rear wheel; hydraulically operable braking equipment for the rear wheel, an axle about which the rear wheel is rotatable, a screw sleeve rotatable on said axle and secured to said driven sprocket, a clutch sleeve threaded on said screw sleeve, said clutch sleeve and said rear wheel having normally engaging clutch faces, said clutch sleeve being rotatable with the screw sleeve and the wheel during forward rotation of the driven sprocket and movable along the screw sleeve by reverse movement of the screw sleeve to disengage the clutch faces, means tending to prevent rotation of the clutch sleeve with the screw sleeve during separation of the clutch faces, and means actuated directly by back pedaling of the crank without intervention of the chain for operating said braking equipment.

12. In a wheel and hydraulic brake equipment for bicycles; the combination with the wheel hub; axle and supporting frame; and the wheel propelling crank; of a brake drum carried by the hub; and a plate, brake actuator cylinder and brake element unit assembly closing and cooperating with the drum, said plate surrounding the axle; means secured to the plate and to the frame for holding the unit assembly stationary with respect to said drum, and means actuated by back pedaling of the crank for applying the brake elements to the drum.

13. In hydraulic braking apparatus for bicycles including front and rear wheels, a frame having a crank bearing, a crank rotatable in the bearing and power transmitting devices between the crank and the rear wheel including a driving clutch member and a driven clutch member, and means for disconnecting the driving clutch member from the driven clutch member upon back pedaling, friction means for restraining rotation of the driving clutch member when released, hydraulically operable braking equipment for the rear wheel and means operated by back pedaling for effecting operation of the braking equipment.

14. In hydraulic braking apparatus for bicycles, the combination with the wheel hub, axle and supporting frame and a wheel propelling crank. A drum carried by the hub and extending radially therefrom, a brake shoe within said drum, a fluid actuator cylinder within said drum having a movable piston contacting with said brake shoe, said brake shoe being movable by fluid pressure against the piston into contact with said drum, a spring for moving said brake shoe from engagement with the drum when pressure on the fluid is released, a second fluid cylinder having a movable piston, a conduit connecting the fluid cylinders, and devices operated upon back pedaling for moving the piston in said second cylinder for transmitting fluid under pressure to the first-named cylinder for effecting operation of the braking shoe.

CHARLES PERRY BALL, JR.